May 12, 1970 W. ORT 3,511,145
PHOTOGRAPHIC CAMERA WITH AN EXPOSURE CONTROL DEVICE
Filed April 8, 1968
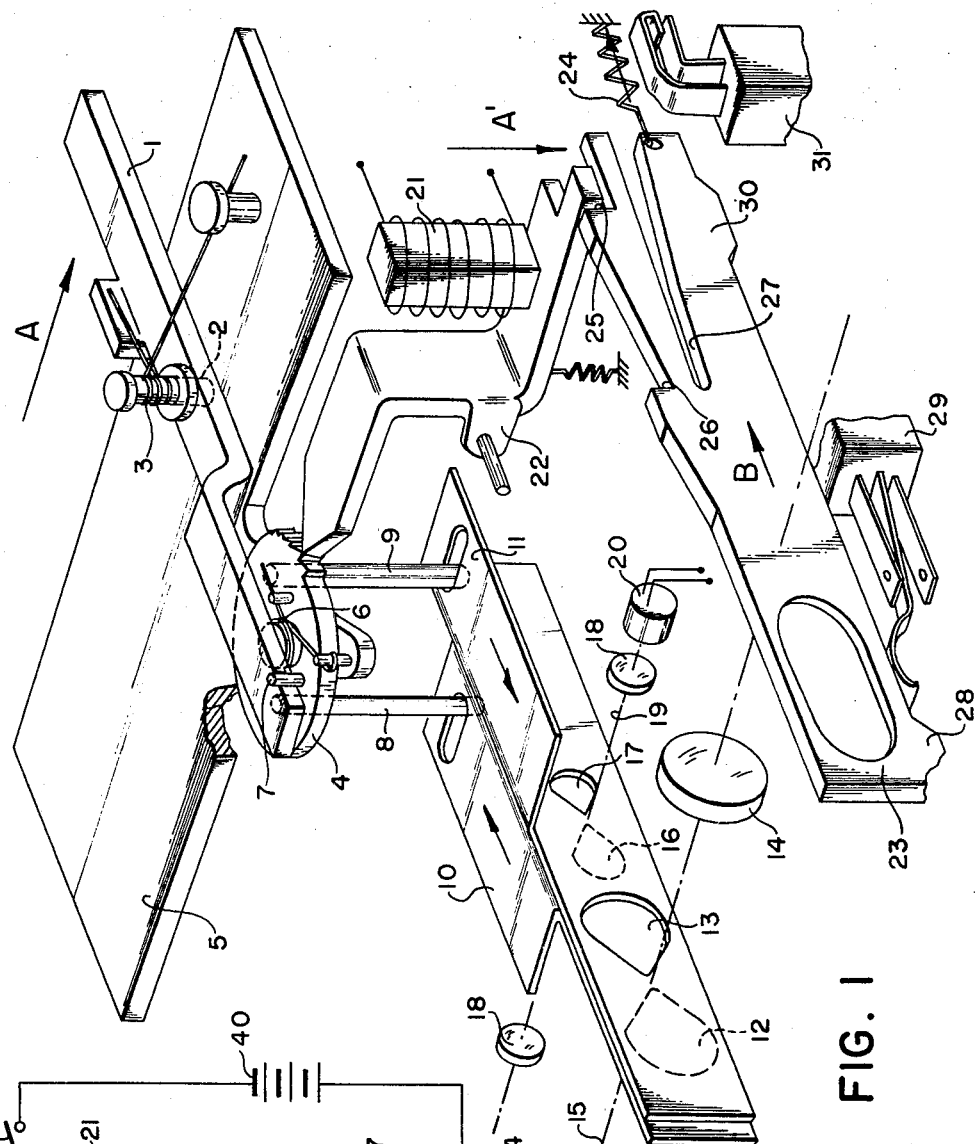
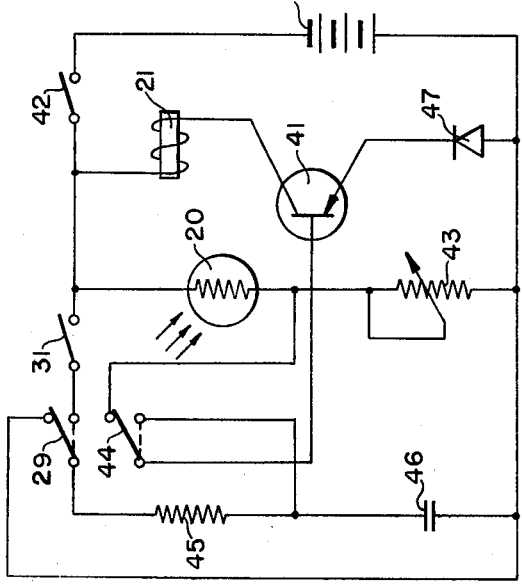
WOLFGANG ORT
INVENTOR.
BY *D. Herman Childress*
*Robert W. Hampton*
ATTORNEYS

United States Patent Office 3,511,145
Patented May 12, 1970

3,511,145
PHOTOGRAPHIC CAMERA WITH AN EXPOSURE CONTROL DEVICE
Wolfgang Ort, Stuttgart, Germany, assignor to Eastman Kodak Company, Rochester, N.Y., a corporation of New Jersey
Filed Apr. 8, 1968, Ser. No. 719,489
Claims priority, application Germany, May 30, 1967, K 62,414
Int. Cl. G03b 7/08, 9/02; G01j 1/46
U.S. Cl. 95—10                    4 Claims

ABSTRACT OF THE DISCLOSURE

A photographic camera comprising an exposure control device dependent on the object brightness. The exposure control device is provided with two oppositely displaceable diaphragm sliders which are operated by two pin-slot connections via one each control rod, the two rods being secured to a disk at an equal distance from its center, so that the rotary motion of the disk is transformed into parallel, oppositely directed movements of the sliders. This is achieved by using a single relay which is controlled by the change of the resistance value of a photoresistance via electronic amplifying systems and mechanical transmission structure.

BACKGROUND OF THE INVENTION

Generally, electric circuits for controlling the shutter speed in case of either diaphragm pre-selection or constant diaphragm, as well as for controlling the diaphragm in case of either shutter speed pre-selection or constant shuter speed are well known in the art.

Furthermore, solutions are known according to which the shutter speed is electronically controlled on an integration basis, the diaphragm being pre-selected. However, these solutions are disadvantageous in that under unfavorable light conditions the exposures may be unsharp, if said unfavorable light conditions necessitate an exposure time exceeding ⅟₃₀ sec. It is possible to additionally provide the speed control mechanism with a moving-coil instrument. This will, however, appreciably raise the price of the camera and, in addition, make the camera susceptible to shock. Finally, the readiness of the camera to take snapshots is reduced by controlling the shutter speed to be expected.

Digital indicating devices have also been used to solve this problem, however, without reaching the aim of completely eliminating the existing disadvantages.

With these electronic shutters there is also the necessity to manually control the lens diaphragm prior to the intended exposure. However, this is not in accordance with the aim of problem-free picture-taking.

Furthermore, devices are known which operate with a single shutter speed and in which a moving-coil instrument operates in dependence of a photoresistance. In this case, the moving-coil instrument actuates one each diaphragm for the lens and photoresistance. In addition to the above-mentioned disadvantages occurring in connection with moving-coil instruments in cameras, these controls do not permit to delay the shutter speed by connecting an RC-member, if the shutter must set a longer speed for flash exposures. In this case, a mechanical escapement mechanism is used. This will, however, also raise the costs.

Finally, reasons of design, such as lack of space in the camera housing and the difficulty to balance the moving-coil, speak against the employment of a moving-coil instrument. Furthermore, it is difficult to mount the moving-coil instrument in any desired geometrical position.

SUMMARY OF THE INVENTION

The object of the invention is to eliminate the described deficiencies and difficulties by using an as simple as possible structure without disregarding the basic aim of problem-free picture-taking.

The invention relates to a photographic camera comprising an exposure control device dependent on the object brightness, in which two oppositely displaceable diaphragm sliders are operated by two pin-slot connections via one each control rod, the two rods being secured to a disk at an equal distance from its center so that the rotary motion of the disk is transformed into parallel, oppositely directed movements of the sliders by using a single relay which is controlled by the change of the resistance value of a photoresistance via electronic amplifying means and mechanical transmission means. The object of the invention is accomplished by controlling the lens diaphragm in a fully automatic manner in the daylight range through the use of an electronic circuit consisting of but three structural elements wherein the opening movement of the diaphragm sliders is terminated by the actuation of a relay, and a mechanically operated shutter with a constant shutter time is immediately thereafter released by the same and single electromagnet. In the flash range the threshold is automatically determined by the circuit and the setting of the same sliders is effected as a function of a manually operable distance setting device known per se, and the circuit is used for electronically delaying the exposure time by connecting an RC-member.

This makes it possible to use an inexpensive type of photoresistance as well as a shutter structure consisting of only few parts and being thus cost-saving because the photoresistance is continuously struck with a constant intensity of illumination. There is also the advantage that the operating range can be put in the temperature-uncritical section of the characteristic, so that complicated temperature compensations are not needed in the electronic circuit.

In further developing the inventive concept, the beginning of the flash range can be indicated mechanically in the viewer ray path, thus reminding the operator to employ a flash unit. This applies above all to indoor shots.

One embodiment of the invention is illustrated in the drawing.

BRIEF DESCRIPTION OF THE DRAWING

FIG. 1 shows the mechanical structure as well as the electro-magnet for actuating both a lens diaphragm and a diaphragm for the photoresistance, as well as for blocking the movement of the diaphragm sliders and the shutter release, respectively;

FIG. 2 shows the electronic circuit for controlling the diaphragm, including the connectable time-controlling RC-member.

DETAILED DESCRIPTION OF THE PREFERRED EMBODIMENT

As illustrated in FIG. 1, a not shown release member acts on the setting lever 1 in the direction of force A, said setting lever 1 being pivoted at 2 and returning under the bias of the coil spring 3 to its initial position as shown immediately after pressure is relieved from the release member. Upon its actuation, the setting lever 1 causes the ratchet wheel 4, which is pivoted on the support plate 5, to rotate in clockwise direction under the bias of the coil spring 6 such that the pin 7 remains in contact with the setting lever 1. Thereby a parallel, oppositely directed movement of the two diaphragm sliders 10 and 11 is controlled by means of the pin-slot connection via the rods 8 and 9 secured to the ratchet wheel 4. These two diaphragm sliders 10 and 11 are provided with apertures 12 and 13 for setting the diaphragm in the optical ray path along the optical axis 15 by means of the optical means 14, as well as with small apertures 16 and 17 for the proportional light measurement in the ray path along the axis 19 in front of the photo-resistance 20 by means of the optical means 18. The movement of the diaphragm sliders from the smallest to the greatest aperture may be interrupted at the ratchet wheel 4 by means of the electromagnet 21 and its armature 22. A shutter slider 23 has an elevated portion 25 which is biased against the armature by a spring 24. When the right end of the armature is raised, the shutter slider is released to move in the direction B. For the "flash" range, the shutter slider 23 is provided with a slot 27, so that upon actuation of the release member the slider is released by force A, which in this case is coupled with force A', to move until it reaches the elevated portion 26, without the action of the electromagnet 21. Only here will the action of the electromagnet 21 release the shutter slider 23, so that it is free to terminate its movement beyond the elevated portion 26. At the beginning of the movement of the shutter slider, the turn-over switch 29 is actuated by the elevated portion 28. In the intermediate position— the open position of the shutter—that is while the elevated portion 26 prevents the shutter slider 23 from terminating its movement, the contact 31 is closed by the elevated portion 30 and opened again only during the further movement of the shutter slider 23.

FIG. 2 shows the electronic circuit whose few parts will be designated in the course of the following functional description. This description will explain in the first part the sequence of operations in the daylight range and in the second part the sequence of operations in the flash range.

For showing the sequence of operations in the daylight range, a constant exposure time of e.g. 1/60 sec. is assumed. For further simplification it is assumed that only one film speed of about 19 DIN is applicable to the camera and that the lens has a diaphragm aperture range of from 2.8 to 22. However, these assumptions are by no means conditions of the functioning of the subject matter of the invention.

Upon camera release, the lever 1 is by the force A swivelled about the pivot 2 contrary to the bias of the coil spring 3. The ratchet wheel 4 follows by a rotary motion about its pivot on the mounting plate 5 under the bias of the coil spring 6, the pin 7 remaining in contact with the setting lever 1. During the rotation of the ratchet wheel 4, the two diaphragm sliders 10 and 11 are displaced parallel to each other in opposite directions, so that the diaphragm, which is completely closed in its inoperative position, is opened from the value 22 towards the value 2.8. The two openings 12 and 13 form the lens diaphragm aperture along the axis 15. The smaller openings 16 and 17 form a proportional diaphragm aperture in front of the photoresistance 20 which together with the lens elements 18 is arranged on the axis 19. This diaphragm aperture in front of the measuring instrument changes equally proportional to the lens diaphragm until a particular brightness value is reached on the photoresistance 20. The simple electronic circuit as shown in FIG. 2 operates in the following manner: The transistor 41 which is connected in parallel to the battery 40 is in the "daylight" range—the switch 42 being closed—its emitter connection being turned on by the center of the voltage divider consisting of the photoresistance 20 and the variable resistor 43. The collector region of the transistor 41 has located therein the coil of the electromagnet 21. The two turn-over switches 44 and 29 are in the solid line position and the switch 31 remains open. When the photoresistance 20 reaches the selected intensity of illumination of e.g. 160 lux, while the aperture is increasing and the switch remains closed during the camera release, the resistance of the photoresistance 20 is reduced to such an extent that the transistor 41 is made conductive by alteration of its base current and the electromagnet is excited. The armature 22 as shown in FIG. 1 is attracted and blocks the movement of the diaphragm sliders by engaging the toothing of the ratchet wheel 4. At the same time, the armature 22 releases the shutter 23 for running down beyond the two elevated portions 25 and 26. The switch 42 opens again as soon as pressure is relieved from the camera release member. The release lever 1 is now free to return the ratchet wheel 4 and at the same time the diaphragm sliders 10 and 11 to their initial position under the bias of the leg spring 3.

If the prevailing light does not suffice to reach the determined threshold for the shutter release, an optical signal is indicated in the viewfinder—as already mentioned—for instance mechanically by the complete run-down of the diaphragm sliders.

In the flash range, however, the diaphragm is mechanically controlled, for instance, by limiting the movement of the diaphragm sliders by the distance setting in a manner known per se. These mechanical details of the construction have been omitted.

For flash photography, the shutter must remain open for a longer period of time, e.g. 1/30 sec. This is achieved by including in the electronic circuit a time-controlling element and by using the circuit for controlling the shutter run-down. However, this is only possible because in this range of operation the circuit is not required for controlling the diaphragm.

The actual changeover can, for instance, be effected by the insertion of the flashbulb: The changeover switch 44 in FIG. 2 connects in its broken line position the transistor base to the RC-member consisting of the resistor 45 and the condenser 46. Immediately after the release, the diaphragm sliders 10 and 11 move to the pre-selected value; then the elevated portion 28 of moving shutter slider 23 causes switch 29 to change over to its broken line position as shown in FIG. 2. FIG. 1 indicates how the slot 27 of the shutter slider 23 releases the latter via the elevated portion 25 upon the action of the force A', so that the slider is free to move until it reaches the elevated portion 26. During the movement of the slider 23, the switch 31 is closed by the elevated portion 30 while the shutter is fully open. The switch 31 closes at the same time the X-contact for the flashlight which is thus released in the open position of the shutter. At the same time begins the charge of the condenser 46 via the resistor 45 until the transistor 41 is turned on and the electromagnet 21 is excited. The now attracted armature 22 releases the shutter slider 23 at the elevated portion 26 for terminating its movement, i.e. for closing the shutter, and permits the ratchet wheel 4 and the release lever 1 to return to their inoperative and initial position, as soon as pressure is relieved from the not shown release member.

In order to make the circuit safe with respect to the turning on and off of the transistor 41, the emitter potential of the transistor 41 is raised via the diode 47. Thereby the base becomes more positive in its inoperative position with respect to the emitter.

The current rise in the collector circuit can begin only after the condenser has been charged to such an extent that the potential balance between the base and the emitter is reached. Therewith the threshold value is clearly fixed.

Upon cocking of the shutter, that is of the shutter slider 23, the change-over switch 29 is returned to its normal solid line position in FIG. 2, so that the condenser can completely discharge. This measure is necessary to prevent any undesired change of the delay time.

The material advantage of the device of the invention and its circuit consists in that, as shown by the embodiment, a cheap photoresistance may be selected, since the operating point lies at a particular intensity of illumination. This arrangement results in the further advantage that no complicated temperature compensation circuit is needed, for it is possible to select a photoresistance which is approximately temperature-stable at the proposed operating point.

The invention has been described in detail with reference to preferred embodiments thereof, but it will be understood that variations and modifications can be effected within the spirit and scope of the invention as described hereinabove and as defined by the appended claims.

I claim:

1. In a photographic camera having a light path therein for the exposure of film in the camera, the improvement comprising:

two sliders positioned adjacent to each other, each of said sliders having two openings therein with one opening in each slider defining a portion of the diaphragm aperture for the camera, means coupled to said sliders for effecting simultaneous relative movement between said sliders in opposite directions and in substantially parallel planes for changing the relative positions of said diaphragm openings, each of said openings in one of said sliders being in at least partial alignment with the corresponding openings in the other slider when the sliders are in one of their positions so that light impinging on said sliders can pass through the aligned openings, a shutter having an exposure opening therethrough and being movable with respect to said sliders for exposing film in the camera with light passing through the diaphragm aperture formed by said openings in said sliders, means for moving said shutter with respect to said sliders, means for locating said shutter in either of two initial positions with respect to said sliders, said shutter opening being aligned with the light path through the slider in one of said initial positions and being offset from said light path in the second of said initial positions, and means for controlling movement of said sliders and said shutter, said control means comprising: (1) a photosensitive member positioned with respect to said second openings in said sliders for receiving light passing through the second of said openings in said sliders when said openings are partially aligned, and (2) means responsive to light striking said photosensitive member for (a) arresting relative movement between said sliders and (b) releasing said shutter from either of its initial positions, said shutter releasing means comprising time delay means for delaying release of the shutter from said one of its initial positions after movement of said sliders has been arrested.

2. In a camera as set forth in claim 1 wherein said means for effecting movement between the sliders comprises:

a ratchet mounted for rotational movement,
means coupled to the ratchet and to said sliders for converting rotational movement of said ratchet into opposite rectilinear movement of said sliders, and means urging said ratchet in a direction to move said sliders toward said one of their positions.

3. In a camera as set forth in claim 2 wherein the means for arresting relative movement between the sliders and releasing the shutter comprises:

an electromagnet, means for energizing said electromagnet in response to light striking said photosensitive member, and a movably mounted armature having a first portion and a second portion, said first portion being positioned with respect to said electromagnet to be attracted to said electromagnet when the latter is energized and said second portion of said armature being movable by attraction of the first portion to the electromagnet into a position with respect to said ratchet for blocking movement of said ratchet, thereby terminating relative movement between the sliders, said armature having a releasable connection with said shutter for releasing said shutter when said armature is attracted to said electromagnet.

4. In a camera as set forth in claim 1 wherein:

the photosensitive member is a photoresistance, said time delay means comprises a resistance-capacitance network, the means for arresting relative movement between the sliders and releasing the shutter includes an electromagnet, and said controlling means comprises an electronic circuit including:
(1) said photoresistance,
(2) said electromagnet,
(3) said time delay means,
(4) a power source for energizing said electromagnet,
(5) an electronic device for selectively controlling energization of the electromagnet from the power source in response to a predetermined biasing current,
(6) and switch means for supplying biasing current to said device either from:
(a) said photoresistance or
(b) said time delay means.

References Cited

UNITED STATES PATENTS

| | | |
|---|---|---|
| 3,027,818 | 4/1962 | Lee et al. |
| 3,205,795 | 9/1965 | Grey. |
| 3,353,462 | 11/1967 | Suzuki. |
| 3,379,107 | 4/1968 | Lieser et al. |
| 3,385,187 | 5/1968 | Bestenreiner. |
| 3,416,421 | 12/1968 | Biedermann et al. |
| 3,455,218 | 7/1969 | Eagle et al. |

NORTON ANSHER, Primary Examiner

J. F. PETERS, Jr., Assistant Examiner

U.S. Cl. X.R.
95—64